United States Patent Office 2,859,162
Patented Nov. 4, 1958

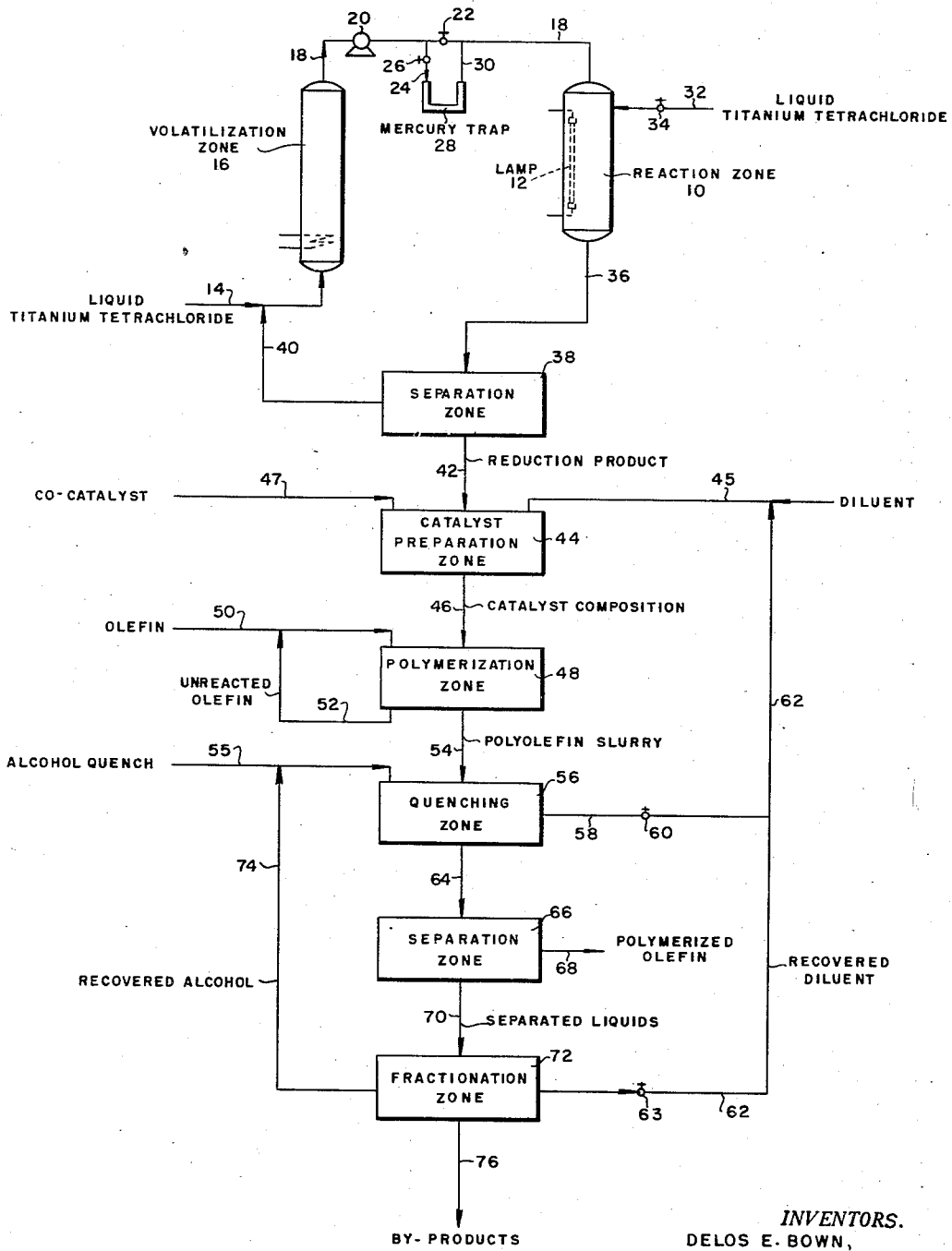

2,859,162

TITANIUM TETRACHLORIDE REDUCTION PROCESS

Delos E. Bown and Frederick W. Lampe, Baytown, Tex., assignors, by mesne assignments, to Esso Research and Engineering Company, Elizabeth, N. J., a corporation of Delaware Application March 4, 1957, Serial No. 643,777

3 Claims. (Cl. 204—157)

This invention relates to a process for reducing titanium tetrachloride. More particularly, this invention relates to a process for producing titanium trichloride which may be used in the preparation of an olefin polymerization catalyst for alpha olefin polymerization as disclosed and claimed in copending Bown, Watson and Schutze application Serial No. 643,503, filed March 4, 1957, and entitled "Olefin Polymerization."

In accordance with the present invention, a product useful for the preparation of an olefin polymerization catalyst is prepared by exposing a mixture of vaporized titanium tetrachloride and a vaporized metal sensitizing agent to radiant energy having a frequency corresponding to the frequency of a resonance line of said sensitizing agent.

The metal sensitizing agent to be used in accordance with the present invention should be a metal such as mercury, cadmium, zinc, etc. having a vapor pressure sufficient to provide a metal vapor concentration in vaporized titanium tetrachloride sufficient to absorb radiant energy efficiently and to an extent which will permit reduction of the titanium tetrachloride to occur. Conveniently this vapor pressure is equivalent to at least 0.001 mm. of mercury at a temperature below about 650° F.

The radiant energy to be employed should have a frequency which can be absorbed by the vaporized metal sensitizing agent, which frequency should correspond to at least one of the lines of the metal sensitizer.

The resonance frequency absorbed by the metal sensitizer must be such that the radiant energy absorbed is equal to or greater than the endothermicity of the reaction between the metallic sensitizer in its ground state and the titanium tetrachloride.

In order to illustrate the resonance lines of metallic sensitizers, the following table is presented.

Table I

| Element | Resonance Lines, A. |
|---|---|
| Hg | 2537 / 1850 |
| Cd | 3261 / 2289 |
| Zn | 3076 / 2139 |

From the foregoing table it is seen, for example, that when mercury is utilized as a metal sensitizing agent the radiant energy should have a wave length of 2537 A., or 1850 A.

The reduction of the vaporized titanium tetrachloride in the presence of a metal sensitizer by exposure to radiant energy may be conducted at a temperature within the range of about 15° to 300° C., temperatures of about 70° to 140° C. being preferred.

In accordance with a preferred form of the present invention, the reduction reaction is conducted at a temperature and pressure such that liquid titanium tetrachloride will be present to provide a nucleating vehicle for the reduced titanium tetrachloride.

The reduction process of the present invention will be further described with respect to the accompanying drawing wherein the single figure is a diagrammatic flow sheet illustrating a preferred manner in which the process of the present invention may be practiced.

In accordance with this showing, there is provided a reaction zone 10 equipped with a radiant energy source such as a lamp 12 capable of emitting light of the desired wave length.

Liquid titanium tetrachloride from any suitable source (not shown) is charged by way of a line 14 to a volatilization zone 16 wherein the titanium tetrachloride is vaporized. In accordance with a preferred form of the present invention, the titanium tetrachloride is brought to a boil within the volatilization zone 16. Vaporized titanium tetrachloride is discharged from the volatilization zone 16 by way of the line 18 containing a pump 20 and controlled by a valve 22.

When necessary or desired, as for example when reduction operations are to be initiated, a portion of the material in the discharge line 18 may be brought into contact with a metal sensitizing agent in order to saturate the vaporized titanium tetrachloride with the metal sensitizing agent.

When mercury, for example, is to be used as the sensitizing agent, mercury vapor may be introduced into the titanium tetrachloride by opening a valve 26 in a branch line 24 leading to a mercury trap 28, such trap being provided with a return line 30. In this situation, the vaporized titanium tetrachloride passing through the trap 28 will become saturated with mercury vapor, which mercury vapor will be charged to the reactor 10 along with the vaporized titanium tetrachloride.

Within the reaction zone 10 the mixture of vaporized metal sensitizer and vaporized titanium tetrachloride is exposed to light of a frequency corresponding to a resonance line of the metal sensitizer whereby reduction of titanium tetrachloride occurs.

In accordance with a preferred form of the present invention, the vaporized titanium tetrachloride is reduced in the presence of liquid titanium tetrachloride which is preferably present in an amount sufficient to continually wash the walls of the reaction zone 10. As indicated, liquid titanium tetrachloride may be introduced into the reaction zone 10 by condensation of a portion of the vaporized titanium tetrachloride. Alternately, or supplementarily, liquid titanium tetrachloride may be introduced into the reaction zone 10 by way of a charge line 32 controlled by a valve 34 leading to a suitable distributing means (not shown) for directing liquid titanium tetrachloride against the walls of the reaction zone 10.

As a result of the reduction reaction, at least a portion of the vaporized titanium tetrachloride is reduced to form a solid reduced titanium chloride product consisting essentially of titanium trichloride. The product collects as a slurry in the bottom of the reaction zone 10 and may be withdrawn therefrom by way of a line 36.

The slurry of reduced titanium tetrachloride in liquid titanium tetrachloride is charged to a suitable separation zone 38 wherein the liquid titanium tetrachloride is separated from the solid reduction product. If desired, the liquid titanium tetrachloride may be recycled to the charge line 14 by way of the recycle line 40.

The reduction product of the present invention finds particular utility as a component for use in the preparation of olefin polymerization catalysts.

When an olefin polymerization catalyst is to be prepared, the solid reduction product is discharged from the zone 38 by way of a conduit 42 leading to a suitable catalyst preparation zone 44 wherein the reduction product is admixed with a suitable organic diluent such as a $C_6$ to $C_{12}$ paraffinic hydrocarbon (e. g., hexane, heptane, etc.), an aromatic hydrocarbon such as benzene, a halogenated hydrocarbon such as chlorobenzene, dichlorobenzene, fluorobenzene, etc., or a mixture of two or more such suitable diluent compounds. The diluent is charged to the catalyst preparation zone by way of a line 45. A co-catalyst which is a reducing organometallic compound and preferably an aluminum alkyl is also charged to the catalyst preparation zone, the co-catalyst being charged by way of a line 47. Illustrative co-catalysts that may be used include compounds such as dialkyl and trialkyl aluminums containing up to 12 carbon atoms per alkyl group such as diethyl aluminum chloride, triethyl aluminum chloride, tripropyl aluminum, triisobutyl aluminum, etc. The aluminum alkyl is preferably proportioned with the reduction product so as to provide from about 0.03 to about 5 (preferably from about 1 to 3) mols of aluminum compound per mol of titanium reduction product. The amount of diluent employed is preferably such that the final composition contains from about 0.01 to about 1 weight percent of aluminum compound-titanium compound co-catalyst.

The resultant catalyst composition is discharged from the catalyst preparation zone 44 by way of a line 46 leading to an olefin polymerization zone 48 wherein an olefin charged thereto by way of a line 50 is polymerized to form a polymer and, more preferably, a normally solid high molecular weight polymer. Among the olefins that may be polymerized are ethylene, propylene, normal butenes, isobutylene, etc., as well as diolefins such as butadiene, isoprene, etc., and mixtures of two or more such mono or diolefins. The olefin polymerization is conducted under polymerization conditions including, for example, a polymerization temperature within the range of about 50° to 200° F. and a polymerization pressure within the range of about 0 to 500 p. s. i. g.

Unreacted olefins are preferably recycled to the olefin charge line 50 by way of recycle line 52 and a slurry of polymerized olefin in the diluent is discharged from the zone 48 by way of a line 54 leading to a quenching zone 56.

In the quenching zone 56 the entire slurry may be quenched with a suitable quenching material such as an aliphatic alcohol to solubilize co-catalyst components. Alternately, the polymerized olefin may be separated from the diluent in the quenching zone 56 in which case only the solid polymer-containing product will be subjected to a quenching operation. In this latter case, the separated diluent may be charged by way of a branch line 58 controlled by a valve 60 leading to a recycle line 62 connected with the diluent charge line 45. In this situation, further, the quenched polyolefin may be recovered from the quenching compound by any suitable manipulative procedure such as centrifugation, filtration, etc.

Alternately, and as shown in the drawing, the entire polyolefin slurry is quenched and the quenched product discharged from the quenching zone 56 by way of a line 64 leading to a separation zone 66 wherein the polymerized olefin is separated from the liquid components of the charge by any suitable means such as centrifugation, filtration, etc. to form a solid polymerized olefin product which is discharged by way of a line 68 and a separated liquids fraction which is discharged by way of a line 70 leading to a fractionation zone 72. Within fractionation zone 72 the separated liquids may be fractionated to provide a recycled diluent fraction recycled to the diluent charge line 45 by opening valve 63 in line 62, an alcohol fraction recycled to the alcohol quench line 55 by way of a recycle line 74 and a by-products liquids fraction by way of the line 76.

The present invention will be further illustrated by the following specific example which is given by way of illustration and is not intended as a limitation on the scope of this invention.

A glass-lined reaction vessel was provided with a lamp capable of emitting radiation of 2537 A. wave length. Vaporized titanium tetrachloride saturated with mercury vapor was exposed to this light whereby reduction of the titanium tetrachloride occurred. The product was a brown colored solid containing essentially 3 chlorine atoms per titanium atom.

A catalyst composition may be prepared by adding to a suitable diluent, such as n-heptane, about 1 weight percent of a mixture of about 2 mols of diethyl aluminum chloride per mol of brown precipitate. Such a catalyst composition may be used for the polymerization of ethylene at atmospheric temperature and pressure to form high molecular weight normally solid polyethylene.

The brown product, when heated, is converted to a purple form of titanium trichloride which is particularly useful in the polymerization of propylene.

What is claimed is:

1. A method which comprises exposing a mixture of vaporized titanium tetrachloride and a vaporized metal sensitizing agent to radiant energy having a frequency corresponding to the frequency of the resonance line of said metal sensitizing agent to thereby reduce at least a portion of said vaporized titanium tetrachloride to a lower valance state, said reduction product being a brown-colored solid containing essentially 3 chlorine atoms per titanium atom.

2. A method as in claim 1 wherein the metal sensitizing agent is mercury and the radiant energy has a wave length of 2537 A.

3. A method which comprises the steps of saturating vaporized titanium tetrachloride with mercury vapor, exposing said mercury saturated titanium tetrachloride vapor to light having a wave length of 2537 A. in the presence of liquid titanium tetrachloride to reduce at least a portion of said vaporized titanium tetrachloride, whereby a slurry of reduction product in liquid titanium tetrachloride is formed and recovering said reduction product from said slurry, said reduction product being a brown-colored solid containing essentially 3 chlorine atoms per titanium atom.

References Cited in the file of this patent

Ellis et al.: "Chemical Action of Ultraviolet Rays," pp. 257–258.

Urbain et al.: "Comptes Rendus," volume 168 (1919), pp. 887 to 889.

Gmelins: Handbuch der Anorganischen Chemie, 8" Aufl., System No. 41, "Titan" (1951), page 294.